(12) United States Patent
Lum et al.

(10) Patent No.: US 7,787,411 B2
(45) Date of Patent: Aug. 31, 2010

(54) GAMING CONSOLE WIRELESS PROTOCOL FOR PERIPHERAL DEVICES

(75) Inventors: Richard S. Lum, Redmond, WA (US); Wei Guo, Sammamish, WA (US); Gary Gordon, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/126,023

(22) Filed: May 10, 2005

(65) Prior Publication Data

US 2006/0256819 A1  Nov. 16, 2006

(51) Int. Cl.
*H04B 7/204* (2006.01)
(52) U.S. Cl. ....................................... 370/319
(58) Field of Classification Search .................. None
See application file for complete search history.

(56) References Cited

U.S. PATENT DOCUMENTS

| 7,177,287 | B1* | 2/2007 | Herring et al. | 370/280 |
| 2001/0056544 | A1 | 12/2001 | Walker | |
| 2002/0097984 | A1 | 7/2002 | Abecassis | |
| 2002/0105930 | A1* | 8/2002 | Sydon et al. | 370/337 |
| 2002/0136183 | A1 | 9/2002 | Chen et al. | |
| 2003/0138080 | A1 | 7/2003 | Nelson et al. | |
| 2003/0219031 | A1* | 11/2003 | Gyselings et al. | 370/442 |
| 2005/0025182 | A1 | 2/2005 | Nazari | |
| 2005/0138359 | A1* | 6/2005 | Simon et al. | 713/156 |
| 2006/0056534 | A1* | 3/2006 | Ionescu et al. | 375/267 |
| 2006/0084504 | A1* | 4/2006 | Chan et al. | 463/39 |

* cited by examiner

*Primary Examiner*—Raj Jain
(74) *Attorney, Agent, or Firm*—Woodcock Washburn LLP

(57) ABSTRACT

Methods of wireless communication between a gaming console and a wireless accessory using a protocol. The protocol is used in a TDMA frequency hopping spread spectrum system to enable simultaneous communication of voice and data between a plurality of wireless accessories and the gaming console. The protocol provides specific time slots for upstream and downstream transmissions, as well as a retransmission time slots to enable a robust environment with minimal latency.

8 Claims, 6 Drawing Sheets

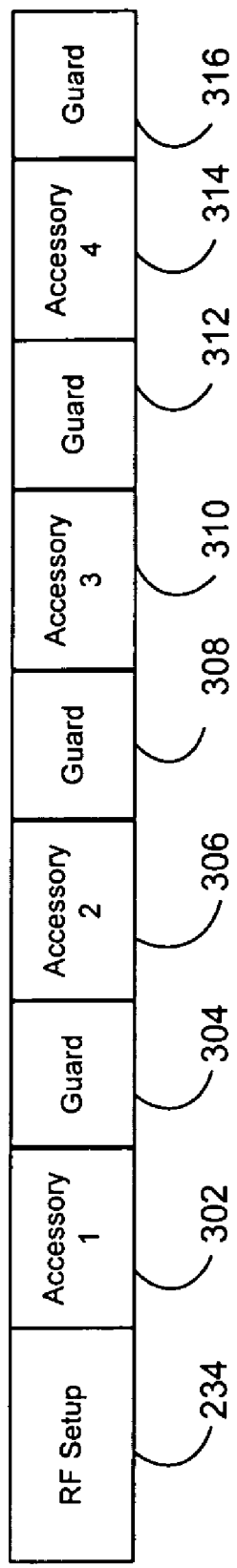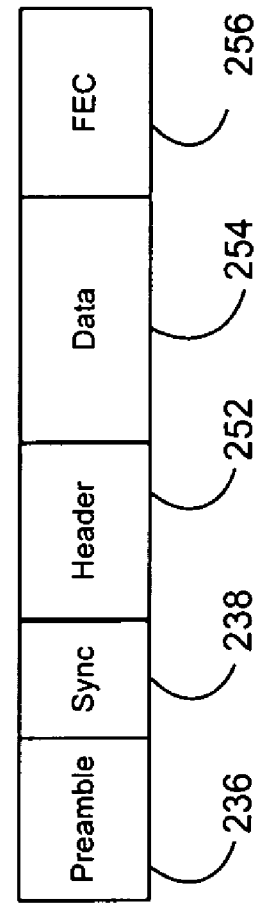

GAMING CONSOLE WIRELESS PROTOCOL FOR PERIPHERAL DEVICES

FIELD OF THE INVENTION

This invention generally relates to the field of gaming and multimedia devices. In particular, the present invention is directed to a wireless protocol used to communicate data and voice information between a gaming device and wireless peripheral accessories.

BACKGROUND OF THE INVENTION

In gaming systems there is a strong demand for wireless controllers in order to eliminate the cabling found strung across so many living room floors. Existing wireless controllers are expensive and do not always provide a robust connection to the gaming device because of interference. Latency is another critical concern to gamers, as it is desirable that the wireless controller respond like a wired controller. In addition, there may be features in future gaming consoles that the wireless link must support. Developing a wireless game controller that meets these constraints would be greatly benefited by a protocol that enables multiple wireless devices to simultaneously communicate with the gaming device, while also providing for error correction and detection with minimal latency. The protocol should also be able to support new devices and functionalities as they become available.

Thus, there is a need for a system that overcomes these and other limitations in the prior art. There is also a need for the system to be cost efficient and effective. The present invention provides such a solution.

SUMMARY OF THE INVENTION

The present invention is directed to methods for communicating voice and data between a gaming console and a wireless accessory using a wireless protocol where the host and the wireless accessory transmit and receive based on a time frame. The method includes transmitting an upstream data packet in an upstream sub frame from the wireless accessory to the host; transmitting at least one of a downstream voice packet and a downstream data packet in a downlink sub frame from the host to the wireless accessory; and transmitting an uplink retransmission packet and a downlink retransmission packet during a retransmission sub frame. The voice data and wireless accessory data are simultaneously communicated via the wireless protocol.

In accordance with a feature of the invention, upstream data packet includes a first upstream data sub packet and a first upstream voice sub packet. The method further includes assigning the first upstream data sub packet and the first upstream voice sub packet a first time slot, and assigning a subsequent upstream data packet that comprises a subsequent data sub packet and a subsequent upstream voice sub packet to a subsequent time slot. A first wireless accessory may transmit wireless accessory data in the first upstream data sub packet, and second voice-enabled device may transmit voice data the first upstream voice sub packet.

In accordance with another feature, the upstream and downstream voice and data packets each comprise an RF setup field, a preamble field, a sync field, a header field, a data field, and an error correction field. The voice data may be communicated in the downstream voice packet to a plurality of voice-enabled devices. In addition, a plurality of downstream voice packets may be communicated in the downlink sub frame.

In accordance with yet another feature, the gaming console may broadcast the downstream data packet to a plurality of wireless accessories. The downstream data packet may include predetermined data sub fields containing data for each of the plurality of wireless accessories. The method may also include transmitting the uplink retransmission packet from the wireless accessory only if an acknowledgement is not received from the gaming console in the downlink sub frame. Likewise, the downlink retransmission packet may be rebroadcast to a plurality of wireless accessories.

In accordance with another feature, each packet may be transmitted within the wireless protocol in a frequency hopping spread spectrum system on a different frequency associated with a Time Division Multiple Access (TDMA) time slot.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 9 and 10 illustrate an uplink retransmission packet.

DETAILED DESCRIPTION OF ILLUSTRATIVE EMBODIMENTS

Figure 1:
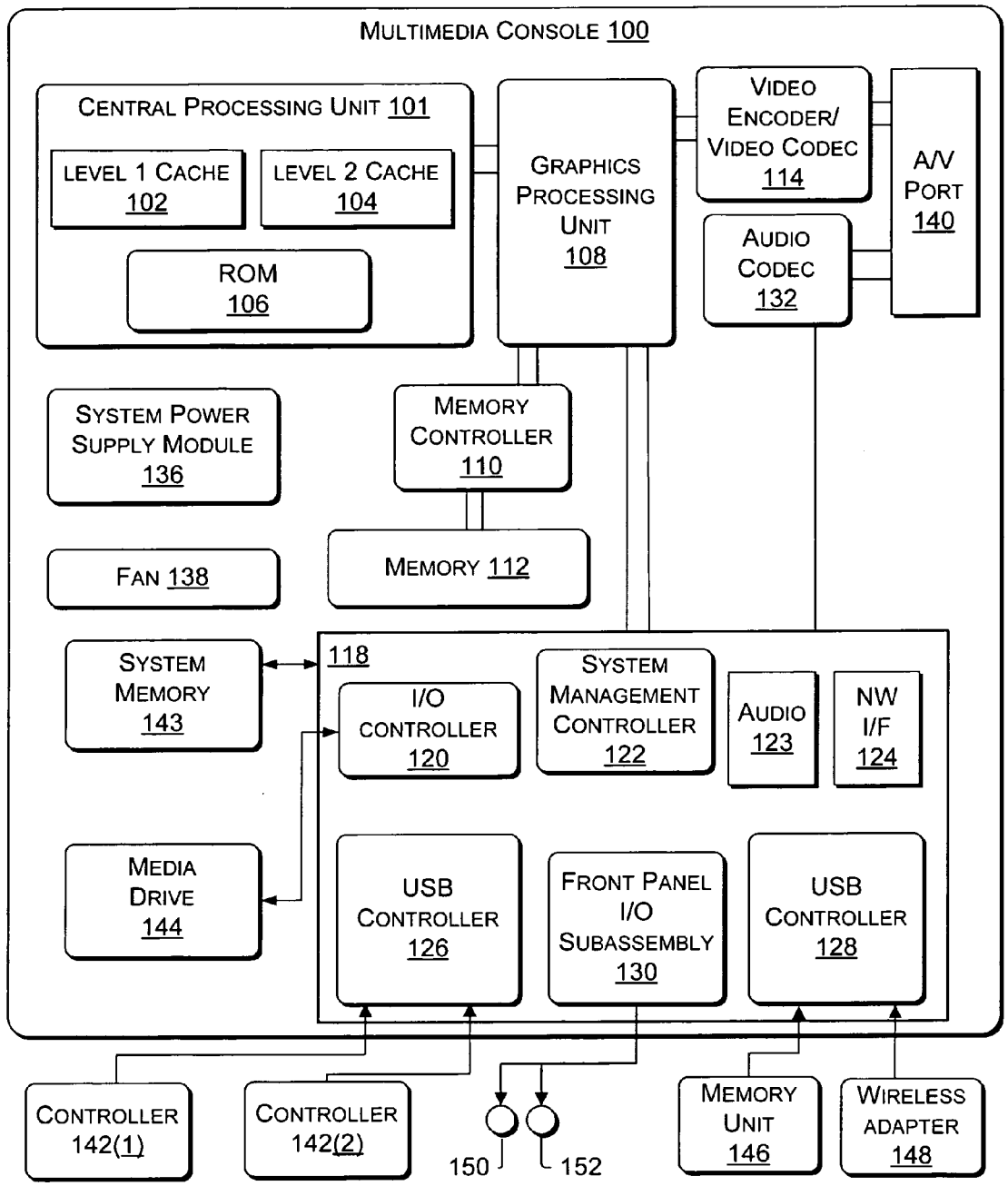
FIG. 1 is a block diagram showing a gaming console in which aspects of the present invention may be implemented.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitates processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 2:
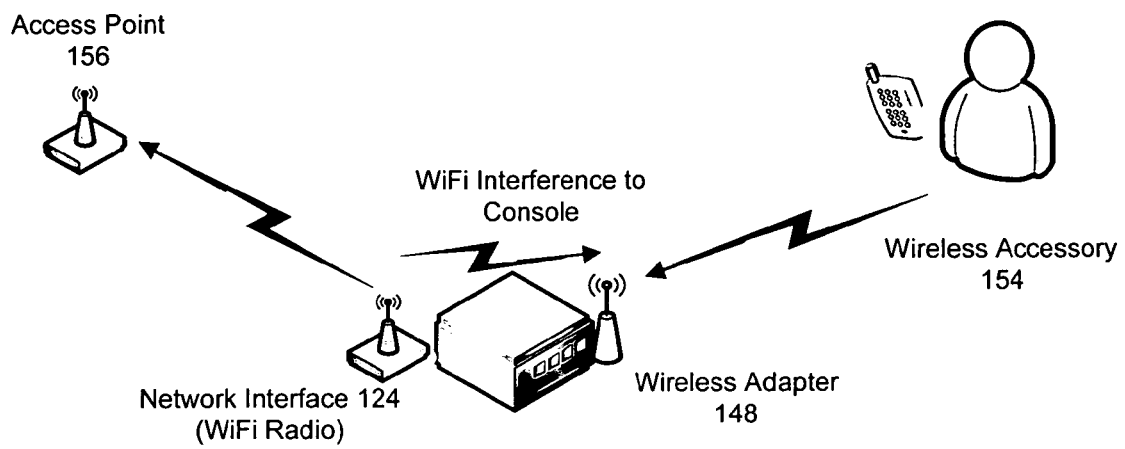
FIG. 2 illustrates the console of FIG. 1 and radio subsystems.

Referring to FIG. 2, the console 100 may be configured having two different radio subsystems. The first wireless system is an 802.11b/g standard compliant module (WiFi) within the network interface 124, which is used for wireless home network connectivity via an access point 156. This can be used in place of a standard Ethernet connection to add wireless networking ability to access the Internet or remote PC's. The second is a frequency-hopping spread spectrum (FHSS), low transmit power system within the wireless adapter 148 operating within the Industrial-Scientific-Medical (ISM) 2.4 GHz band. The wireless adapter 148 provides wireless connectivity of various peripherals and devices (e.g., a wireless accessory 154) which can be used to operate the games.

Exemplary Embodiments of a Wireless Protocol

Figure 3:
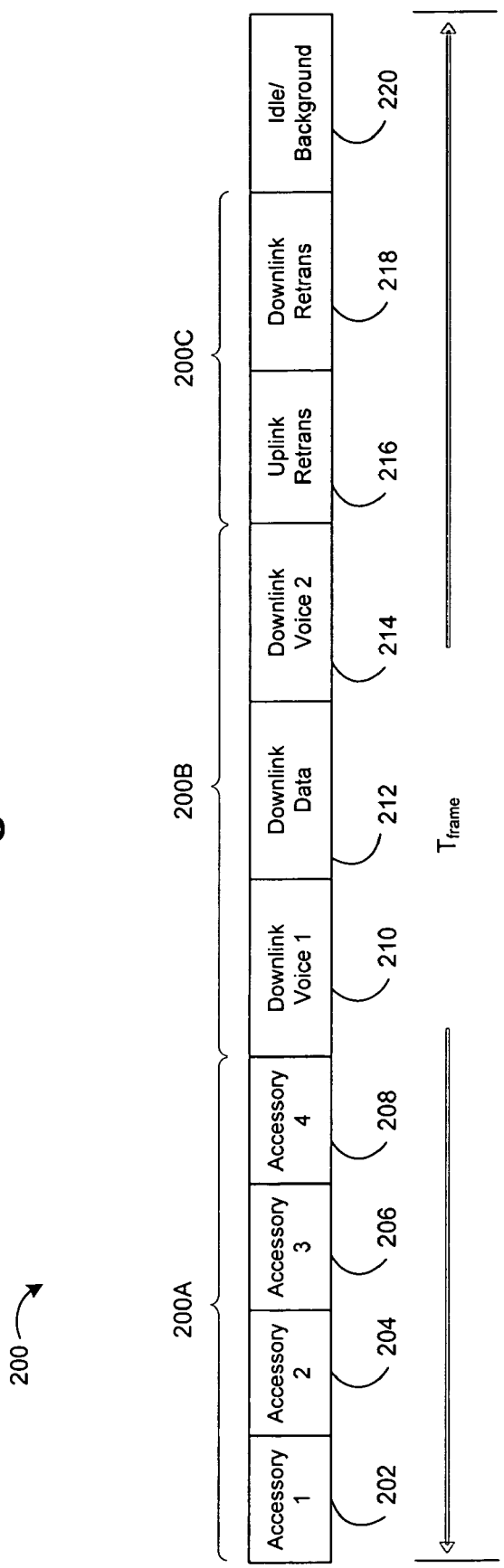
FIG. 3 illustrates an overall framework of a protocol in accordance with the present invention.
Figure 4:
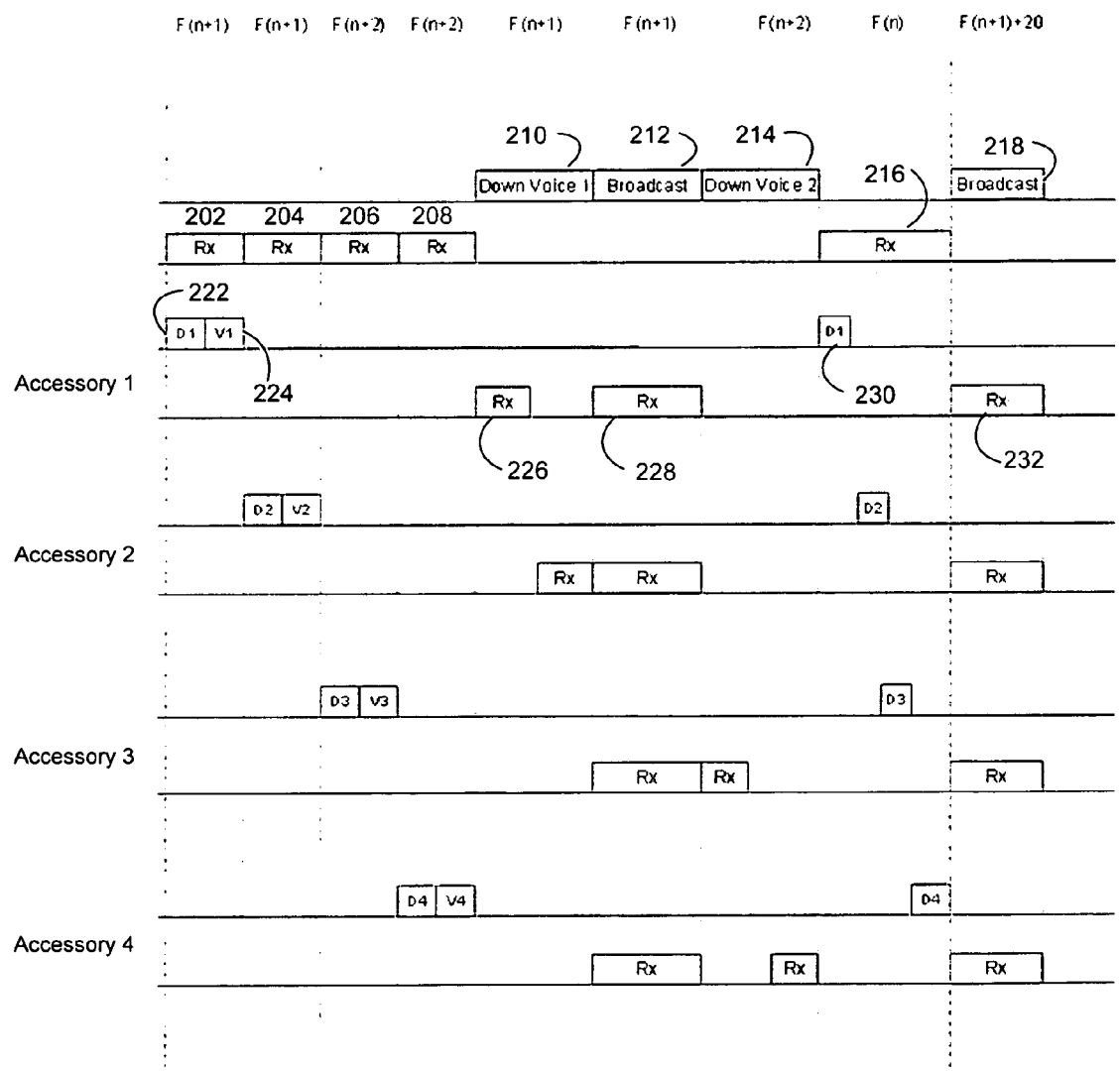
FIG. 4 illustrates a frame structure of the protocol of FIG. 3 in the time domain.

Referring to FIGS. 3 and 4, there is shown the protocol framework of the present invention. FIG. 3 illustrates an overall framework of the protocol. The protocol 200 is a TDMA system through which the host (e.g., console 100) and device (e.g., accessory 154) switch between transmitting and receiving based on a fixed time interval shown as $T_{frame}$. As will be described below, the protocol 200 enables up to eight accessories (four data and four voice) to simultaneously communicate to the console 100. In addition, the protocol 200 provides for a mix of error correction and the use of frequency hopping techniques to provide for robust communication with minimal latency. The protocol 200 is divided into three sub frames, upstream data packets 202-208, downstream data packets 210-214 and retransmission packets 216-218. Each will be described in greater detail below.

Referring now to FIG. 4, there is illustrated the frame structure of the protocol 200 in the main. Inside each frame, there are 9 slots where the frequency allocation for each slot is shown in Table 1, below. In the table, n represents the entry for the current frame in the FHSS sequence, and F(n) is the channel that is mapped to this entry n and therefore the channel selected for this frame. The F(n+1)+20 represents a channel that is 20 channels away from channel F(n+1).

TABLE 1

| Slot # | Slot Description | Channel |
| --- | --- | --- |
| 0 | Accessory 1 data and voice 1 Tx | F(n + 1) |
| 1 | Accessory 2 data and voice 2 Tx | F(n + 1) |
| 2 | Accessory 3 data and voice 3 Tx | F(n + 2) |
| 3 | Accessory 4 data and voice 4 Tx | F(n + 2) |
| 4 | Voice 1 and 2 downstream | F(n + 1) |
| 5 | Broadcast | F(n + 1) |
| 6 | Voice 3 and 4 downstream | F(n + 2) |
| 7 | Controller retransmission | F(n) |
| 8 | Broadcast Retransmission | F(n + 1) + 20 |

As will become evident to those of ordinary skill in the art, each accessory and/or voice-enabled device receives and transmits packets in a similar fashion, however at its appropriate time slot in accordance with the TDMA structure of the protocol 200. As such, the following description will be made with reference to accessory 1, but it applies to each of accessories 2-4, as shown in FIG. 4. At time slot F(n+1), accessory 1 may transmit data and voice sub packets 222 and 224. Optionally, accessory 1 may transmit data in a data sub packet, and a separate voice-enabled device may transmit voice in a voice sub packet during the time slot. Accessory 1 (or voice-enabled device) will receive a voice data packet 226 at time slot F(n+1).

The console 100 will broadcast a data packet 228 to all devices at time slot F(n+1). The data packet will be rebroadcast as data packet 232 at time slot F(n+1)+20. At time slot F(n), accessory 1 may rebroadcast its data sub packet as data sub packet 230. This preferably done only if data sub packet 222 is not acknowledged by the console 100 in the data broadcast packet 228.

Figure 5:
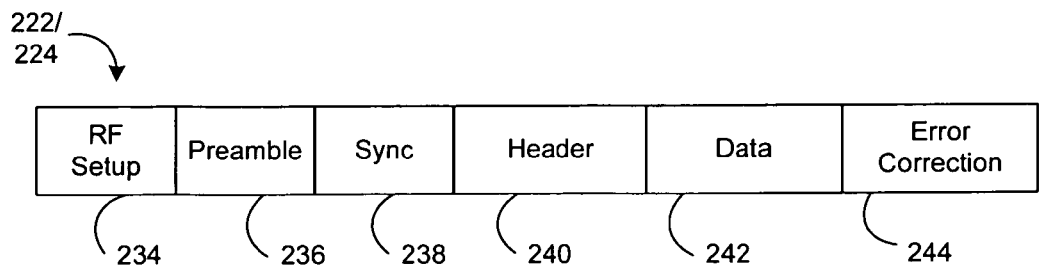
FIG. 5 illustrates a format for data and voice packets.

Referring now to FIG. 5, there is illustrated the basic packet format in accordance with the present invention for both data packets 222 and voice packets 224. An optional RF Setup field 234 enables the host/device transceiver to switch from one mode (transmit/receive) to the other (receive/transmit) or change the transceiver frequency for frequency hopping. A preamble field 236 and synchronization field 238 are used by the receiver within the accessory for clock and packet synchronization of the radio link. For example, 32-bit prolonged preamble transmissions may be used in combination with a preamble switched antenna instant receiver selection diversity algorithm implemented at the receiving end. This algorithm implies that the receiver during the first part of the preamble makes a first link quality estimate using one antenna, and during a second part makes a second estimate using the other antenna, and then, for the rest of the packet, selects the antenna which gave the highest quality estimate.

A sync field 238 is used by the receiving device to synchronize with the transmitting frequency and phase. A header field 240 contains the information needed for data payload field that follows the header. The data payload field 242 contains the information that is to be transmitted over the wireless interface. The length of this field is determined by type of the packet. The data packet is either error detectable or correctable based on the packet type using an error correction field 244. For example, a cyclic redundancy code (CRC) may be used for detecting the packet error for voice packets, whereas forward error correction (FEC) is used for the data transmissions. Reed-Solomon forward error correction algorithm may be used here. The Reed-Solomon encoder takes the original data and adds extra "redundant" bits. Errors occur during the wireless transmission. The Reed-Solomon decoder processes the received data and attempts to correct errors and recover the original data. The number and type of errors that can be corrected depends on the characteristics of the Reed-Solomon code.

As noted above, the wireless system uses frequency hopping spread spectrum. A Pseudo-Random hopping sequence may be used for the system. The sequence generation may be based on a Maximum-Length Linear Feedback Shift Registers (ML-LFSR) method. Two channel allocation schemes may be used in the wireless protocol 200. The first scheme is a frame based allocation and the second scheme is a slot based channel allocation. For the frame based channel allocation, the 7 LSb out of the 19 bits of the M-sequence are used for selecting the RF channel for each frame. First, the system calculates the remainder of the 7LSb/41, and the reminder is then used as the channel number for the frame. For example, if the 7 LSB of a hop entry is 1011001, the table entry for the RF channel for this entry is:

1011001 MOD (41)=89 MOD 41=7

Thus, Channel 7 is selected.

To be fully compliant with FCC requirements, each channel has to be equally accessed. This means that if the 7LSb of the hopping entry is greater than 122, this entry will be skipped and next entry will be used. For the slot based channel selection, after the channel for each frame is selected, inside each frame, there are 9 slots. The frequency allocation for each slot then made in accordance with Table 1, above.

Upstream Sub Frame 200A

Figure 6:
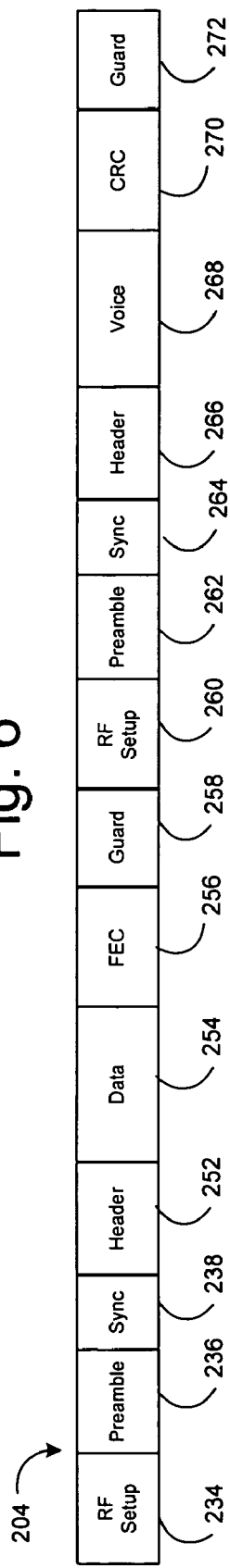
FIG. 6 illustrate an upstream data packet.

Referring to FIGS. 3 and 6, the upstream data packets are the data packets sent by the accessories and devices 154 to console 100, and include the accessory data packets 202, 204, 206 and 208. The protocol 200 supports up to 4 upstream data packets. Each data packet is sent at the predefined time slot (FIG. 4) and contains both the device-specific data as well as the voice data.

Referring to FIG. 6, there is illustrated the upstream data packet 204 (also 202, 206 and 208) in greater detail. As illustrated, there are two sub packets inside each packet, one for data (234-258) and the other for voice (260-272). These correspond to, e.g., data sub packet 222 and voice sub packet 224 in FIG. 4. Up to 4 upstream data packets are supported for up to 4 accessories and voice devices for a total of 8 devices.

Each upstream data sub packet (234-258) contains three fields: a header 252, data body 254, and an FEC field 256. The header field 252 contains the information about the accessory data field, dynamic power management and quality of service (QoS). The data field 254 format may be specified in a packet type field in the header 252 and may be that of FIG. 5. The upstream data field contains the data for the accessory 154 and a Plug-in Module (PMD) (i.e., a plug-in that may be connected to the accessory 154 to enhance its features). The FEC field 256 may contain Reed-Solomon parity bytes. The parity bytes cover both the header and data fields of the upstream game controller sub packet.

The upstream voice sub packet (260-272) contains three fields: a header field 266, a voice data field 268 and a CRC field 270. The header field 266 indicates the types and properties of the voice data packet. The voice data field 268 contains encoded voice data and link control data and may be structured as shown in FIG. 5. The CRC field 270 covers both the voice header field and the voice data field.

Downstream Sub Frame 200B

Figure 7:
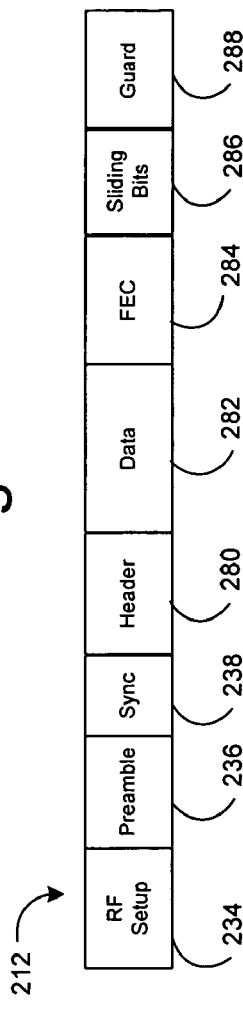
FIG. 7 illustrates a downlink data packet.
Figure 8:
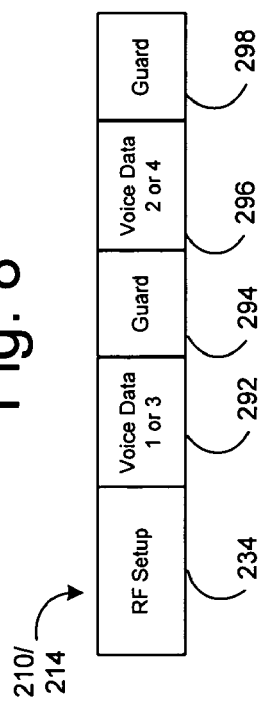
FIG. 8 illustrates a downlink voice packet.

Referring to FIGS. 3 and 7-8, the downstream sub frame includes three packets: a voice downstream packet 210, a downlink data packet 212 and a voice downstream packet 214. Referring to FIG. 7, there is illustrated the downlink data packet 212. This packet 212 contains system control information and is broadcasted to all the attached devices and accessories. A header field 280 of this packet 212 contains the system control information to be broadcasted A data field 282 contains control information for each device being addressed in the data packet 212. Thus, if four accessories are to be addressed, the data field 282 would be divided into four sub fields, each containing data for each device. The control information may contain details about flashing of LEDs on the accessory 154, motor control, feedback control, etc. The broadcast packet is protected by an FEC field 284 and is repeated automatically in every frame. A sliding field 286 may be added at end of the downstream broadcast. It is preferable that the bits pattern have a minimum correlation with the preamble field and a pattern OxC3C3 may be used here. The accessory receiver checks the sliding field 286 in every broadcast packet received and tests for a packet sliding situation. If the accessory receiver detects sliding, it will set a bit in QoS and report it to host. Once sliding is detected, the detection party needs to stay on the current FHSS entry for the next frame to avoid the synchronization.

Referring to FIG. 8, there is illustrated an exemplary format of the downlink voice packets 210 and 214. These two packets 210 and 214 carry the downstream voice data for the four voice-enabled devices. The downlink voice packet 210 contains the voice samples for device 1 and 2. The downlink voice packet 214 contains the samples for device 3 and 4. As shown in FIG. 8, there are two voice downstream data fields 292 and 296 separated by guard fields 294 and 298. The structure of each of the data fields 292 and 296 is detailed in FIG. 5.

Retransmission Sub Frame 200C

Referring now to FIGS. 9 and 10, there is illustrated the uplink retransmission packet 216. This packet only re-transmits the accessory data, and only if an ACK bit in the broadcast packet 212 is not set for a particular accessory. This helps achieve a robust environment while reducing the power consumption of the accessory. If the above condition exists, the accessory will re-send its data and PMD data in the retransmission packet 216. The upstream voice data is not retransmitted in this packet. Since there is no ACK bit set in the broadcast retransmission packet, the same accessory packet will be re-transmitted again in the next frame if there is no new data available. If new accessory data is available, the accessory will send the new data packet instead.

The broadcast retransmission packet 218 is the repetition of the broadcast packet 212. It transmits the same information as in broadcast packet, but on a different carrier frequency (see, FIG. 4). In the broadcast retransmission packet, a retransmit bit in the header is set to 1 to indicate this is a broadcast retransmission packet. The ACK bit in the broadcast retransmission packet is NOT set or cleared based on the reception of the upstream re-transmission packet. The console 100 preferably always transmits the broadcast retransmission packet. This is to improve the broadcast packet immunity to interference since the control data in the broadcast packet is critical for the wireless interface data exchange. However, an accessory may choose not to receive the retransmission packet based on the successfully reception of the first broadcast packet. This will help reduce the total power consumption for the accessory.

In addition to the above, the protocol of the present invention provides for a flexible environment where devices known and unknown may be enabled to communicate via the wireless link.

While the present invention has been described in connection with the preferred embodiments of the various Figs., it is to be understood that other similar embodiments may be used or modifications and additions may be made to the described embodiment for performing the same function of the present invention without deviating therefrom.

What is claimed is:

1. A method of communicating between a gaming console and a wireless accessory using a wireless protocol wherein said gaming console and said wireless accessory transmit and receive based on a time frame, said method comprising:

transmitting an upstream data packet in an upstream sub frame from said wireless accessory to said gaming console, said upstream data packet comprising a first upstream data sub packet and a first upstream voice sub packet;

receiving at least one of a downstream voice packet and a downstream data packet in a downlink sub frame from said gaming console;

wherein voice data and wireless accessory data are simultaneously communicated via said wireless protocol, and wherein transmission of each packet is in a frequency hopping spread spectrum system on a different frequency associated with a Time Division Multiple Access (TDMA) time slot;

assigning said first upstream data sub packet and said first upstream voice sub packet a first time slot; and assigning a subsequent upstream data packet that comprises a subsequent data sub packet and a subsequent upstream voice sub packet to a subsequent time slot.

2. The method of claim 1, further comprising:

transmitting, from a first wireless accessory, wireless accessory data in said first upstream data sub packet; and transmitting, from a second voice-enabled device, voice data in said first upstream voice sub packet.

3. The method of claim 1, wherein said upstream and downstream voice and data packets each comprise an RF setup field, a preamble field, a sync field, a header field, a data field, and an error correction field.

4. The method of claim 1, further comprising communicating said voice data in said downstream voice packet to a plurality of voice-enabled devices.

5. The method of claim 4, further comprising communicating a plurality of downstream voice packets in said downlink sub frame.

6. The method of claim 1, further comprising:
broadcasting, from said gaming console, said downstream data packet to a plurality of wireless accessories, said downstream data packet comprising predetermined data sub fields containing data for each of said plurality of wireless accessories.

7. The method of claim 1, further comprising:
transmitting an uplink retransmission packet from said wireless accessory only if an acknowledgement is not received from said gaming console in said downlink sub frame.

8. The method of claim 1, further comprising broadcasting a downlink retransmission packet to a plurality of wireless accessories.

* * * * *